United States Patent [19]
Kurokawa et al.

[11] Patent Number: 5,927,673
[45] Date of Patent: Jul. 27, 1999

[54] ADJUSTABLE VIEWING STAND

[75] Inventors: Haruo Kurokawa, Morrisville; Charles Hunt, Raleigh, both of N.C.

[73] Assignee: Ericsson Inc., Research Triangle Park, N.C.

[21] Appl. No.: 08/937,750

[22] Filed: Sep. 26, 1997

[51] Int. Cl.⁶ .............................. A47G 1/24; A47B 97/04; A41F 1/00
[52] U.S. Cl. ............................. 248/456; 248/460; 24/462
[58] Field of Search ..................................... 248/442, 444, 248/447, 454, 455, 456, 457, 460, 462, 463, 917, 918, 919, 224.8; 403/122, 133; 40/747, 748, 753, 755; 24/460, 462

[56] References Cited

PUBLICATIONS

Sony Magic Link Case and Stand Combination Made of Plastic Reinforced Vinyl; Parts A–F; 2 pages.

*Primary Examiner*—Ramon O. Ramirez
*Assistant Examiner*—Michael Nornberg
*Attorney, Agent, or Firm*—Jenkens & Gilchrist, P.C.

[57] ABSTRACT

A viewing stand for an electronic device is composed of a mounting plate, a base, a selection arm, and a pivot pin. The base is pivotally connected to the mounting plate by the pivot pin. The selection arm is rotatably coupled to the base. A viewing position can be selected by rotating the base to a desired position. A desired position can correspond to an upright position, whereby the electronic device can be viewed horizontally, or to a gently sloping position, whereby the electronic device can be viewed from above. Once the base is in the desired position, the selection arm can be inserted into a corresponding positioning receptacle located on the mounting plate. Multiple positioning receptacles permit multiple viewing positions, thus enhancing the viewing options for the user of the electronic device. When no longer needed, the viewing stand folds flat against the electronic device to maintain a narrow profile.

32 Claims, 8 Drawing Sheets

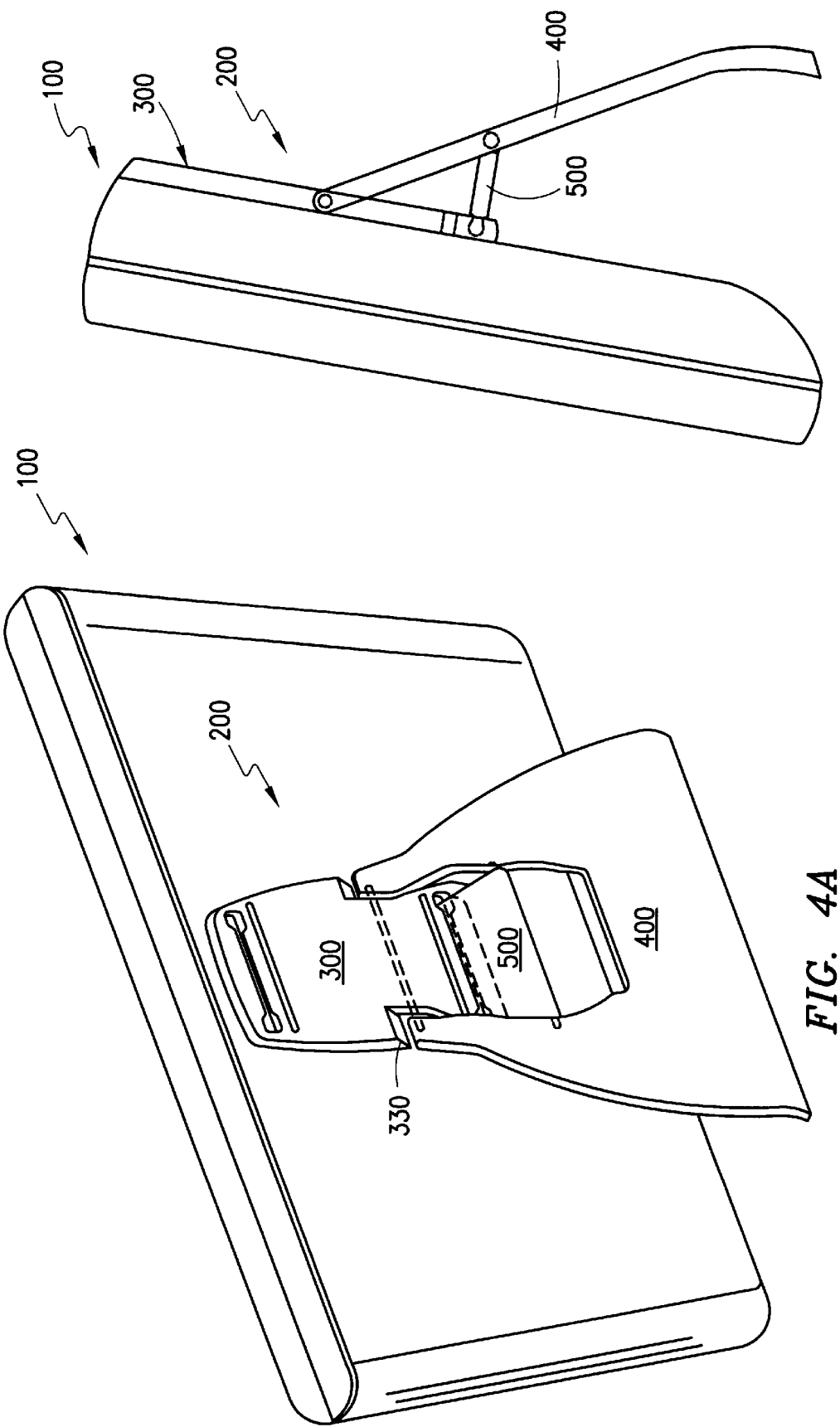

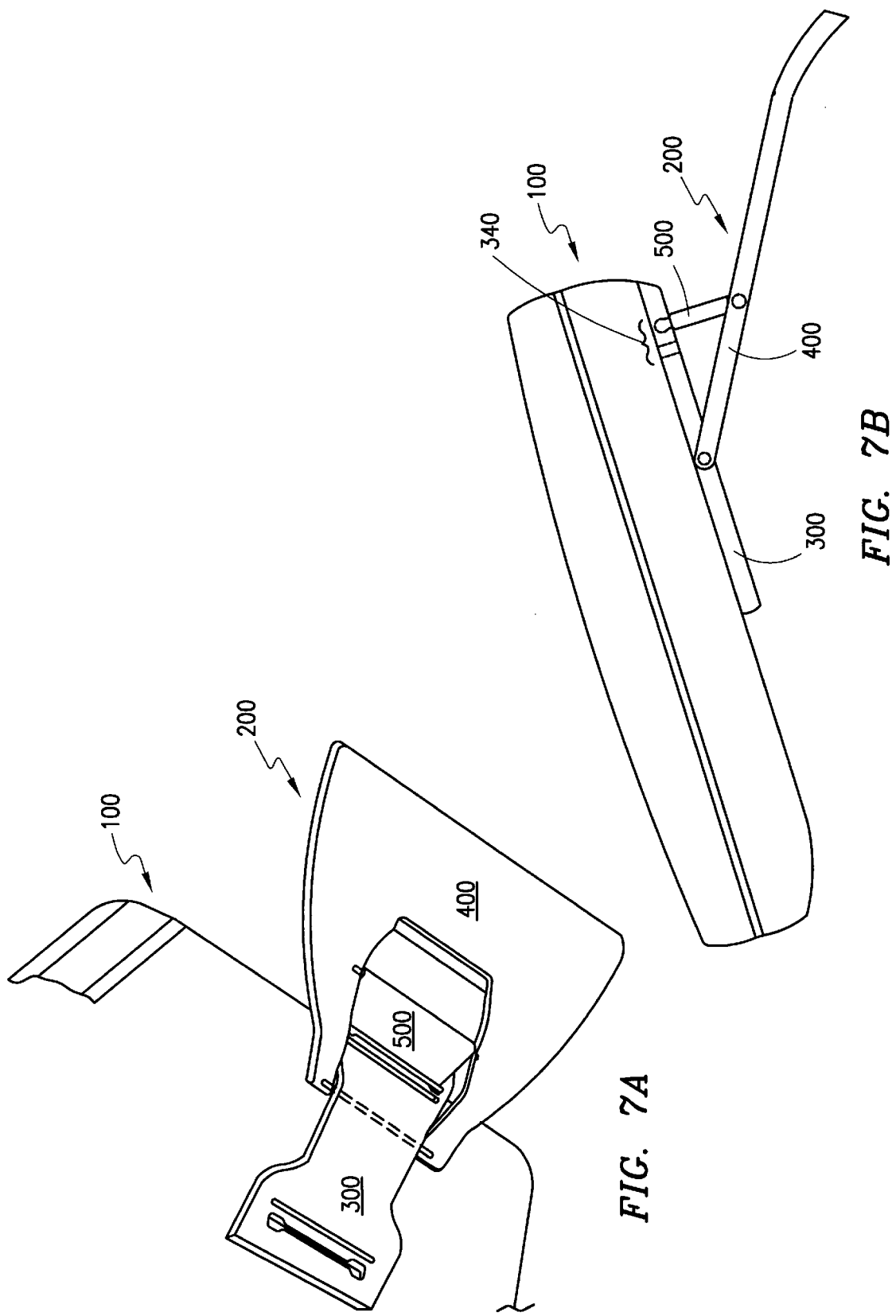

ADJUSTABLE VIEWING STAND

BACKGROUND OF THE INVENTION

1. Technical Field of the Invention

The present invention relates to the field of viewing stands for electronic devices and, in particular, to an adjustable viewing stand for use with hand-held devices.

2. Description of Related Art

Viewing stands have long been used as tools to aid in viewing certain devices or objects. A viewing stand can be used to hold up an object so that it can be viewed from various positions. Some viewing stands can be folded for portability and ease of use, and some are built into the object to be viewed. Examples of common viewing stands are picture frames and art easels.

More recently, viewing stands have been used with certain electronic devices, such as electronic organizers and calculators. Typically, the viewing stand supports the device in an upright position to enhance ease of viewing and reduce glare. The stand also reduces the physical footprint of the electronic device on a surface, which is a very important feature for a confined space (e.g., a tray table on an aircraft).

A viewing stand is particularly useful for a Personal Digital Assistant (PDA), which is a small, electronic organizer. Without a viewing stand, these small devices are either hand-held or placed flat on a surface to be viewed. If hand-held, the user may experience fatigue from holding the device for a prolonged period. Also, only one hand is left free to perform other functions, such as operating the device. If the device is placed on a flat surface, the display (e.g., liquid crystal display) may be illegible unless viewed directly, which is often an inconvenient position for a user.

FIGS. 1A–1F illustrate a prior art viewing stand for a small electronic device. Referring first to FIG. 1A, a case and stand combination of the prior art is pictured. The case/stand 10 is fabricated from plastic reinforced vinyl. Rivets 20 secure the stand to the case. Snaps 30 in FIG. 1B are riveted into the case; the snaps attach to the electronic device and secure it to the case. A hook and latch material 40 is shown in FIGS. 1B and 1C at attachment points. Hook and latch material 40 is used to keep the case components in place.

FIGS. 1B, 1C, and 1D, collectively demonstrate the operation of stand implement 50. First, stand implement 50 is detached from case/stand 10. Second, stand implement 50 is folded in two places at one end and angled away from the body of case/stand 10 at the other. Third, hook and latch material 40 is then brought into contact to secure the now-angled stand implement 50 to the case/stand 10. FIG. 1E illustrates a third location of hook and latch material 40 and the process of folding the cover 60 away from the electronic device 70. FIG. 1F pictures the electronic device 70 being supported by case/stand 10.

As shown by way of example in FIGS. 1A–1F, existing prior art viewing stands used with small electronic devices are limited to a single, non-adjustable viewing position. If a user desires a different viewing position, the device must again be hand-held or placed flat on a surface. Furthermore, some existing viewing stands are attached to a carrying case rather than the device. Consequently, a carrying case must accompany the device if the viewing stand is to be used.

Therefore, it is an object of the present invention to provide a viewing stand for an apparatus, like a small electronic device, that can be easily and conveniently adjusted to a plurality of viewing positions.

It is another object of the present invention to provide a viewing stand that enables an apparatus to be viewed horizontally (viewed head on with the apparatus in an upright position) or vertically (viewed from above with the apparatus in a gently sloping position).

It is still another object of the present invention to provide a viewing stand for an apparatus that can be attached directly to the apparatus.

SUMMARY OF THE INVENTION

In accordance with a preferred embodiment of the present invention, the foregoing and other objects are achieved with an adjustable viewing stand for a small electronic device that can be set to various viewing positions. The viewing stand includes a mounting plate (or, more generally, a mounting area) that is attached directly to or internal with the electronic device, a base (or, more generally, a first member) that is pivotally connected to the mounting plate, and a selection arm (or, more generally, a second member) that is pivotally connected to the base. The viewing stand enables the electronic device to be viewed in either a generally upright position or a generally gently sloping position.

These viewing angle positions can be selected by rotating the base to a predetermined angle and inserting the selection arm into a positioning receptacle (or, more generally, an attachment point) located on the mounting plate. A plurality of viewing positions can be achieved with a plurality of positioning receptacles on the mounting plate. When the viewing stand is not in use, the base and selection arm can be folded flat against the electronic device, thereby maintaining a narrow profile for the device.

In another aspect of the invention, the positioning receptacle utilizes a flexible member and flexible slot so that the selection arm can be snapped securely into the positioning receptacle. This advantageous feature secures the viewing stand at desired viewing position. When a different viewing position is desired or the viewing stand is no longer needed, the selection arm can be snapped out of the positioning receptacle with minimal effort.

BRIEF DESCRIPTION OF THE DRAWINGS

A more complete understanding of the method and apparatus of the present invention may be had by reference to the following detailed description when taken in conjunction with the accompanying drawings wherein:

FIG. 4A is a perspective view of an open viewing stand in an upright position attached to an electronic device, in accordance with a preferred embodiment of the present invention;

FIG. 4B is a side view of the open viewing stand and electronic device shown in FIG. 4A;

FIG. 7A is a perspective view of a viewing stand set at a low viewing angle while attached to an electronic device, in accordance with a preferred embodiment of the present invention;

FIG. 7B is a side view of the viewing stand and electronic device shown in FIG. 7A.

DETAILED DESCRIPTION OF THE DRAWINGS

The preferred embodiment of the present invention and its advantages are best understood by referring to FIGS. 2A–8 of the drawings, like numerals being used for like and corresponding parts of the various drawings.

Figures 1A, 1B, 1C:
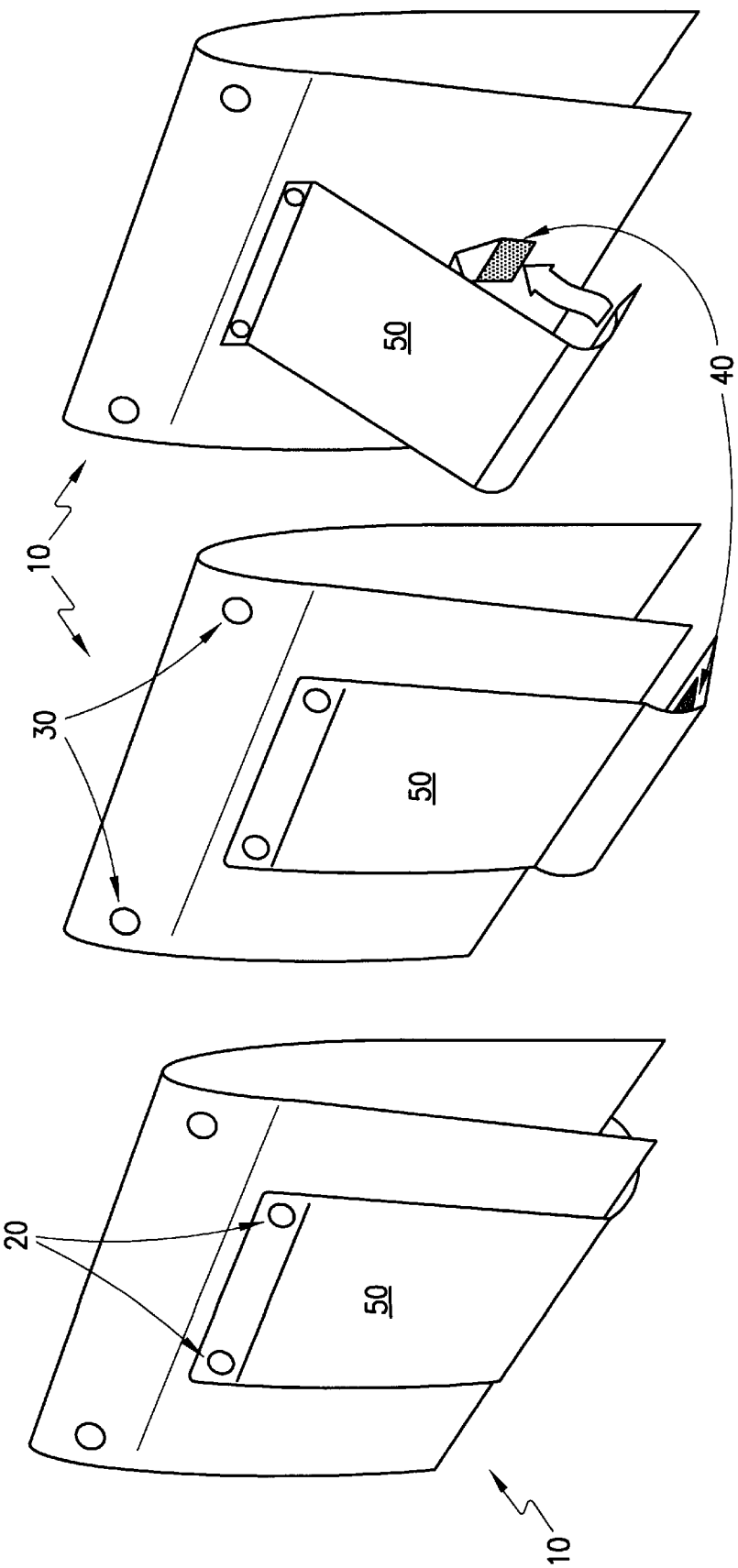
FIGS. 1A, 1B, 1C, 1D, 1E, and 1F illustrate a prior art non-adjustable viewing stand.
Figure 1F:
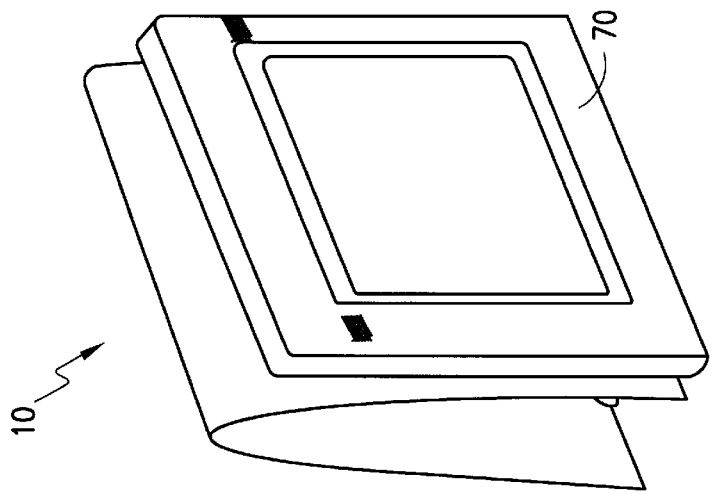
Figure 1E:
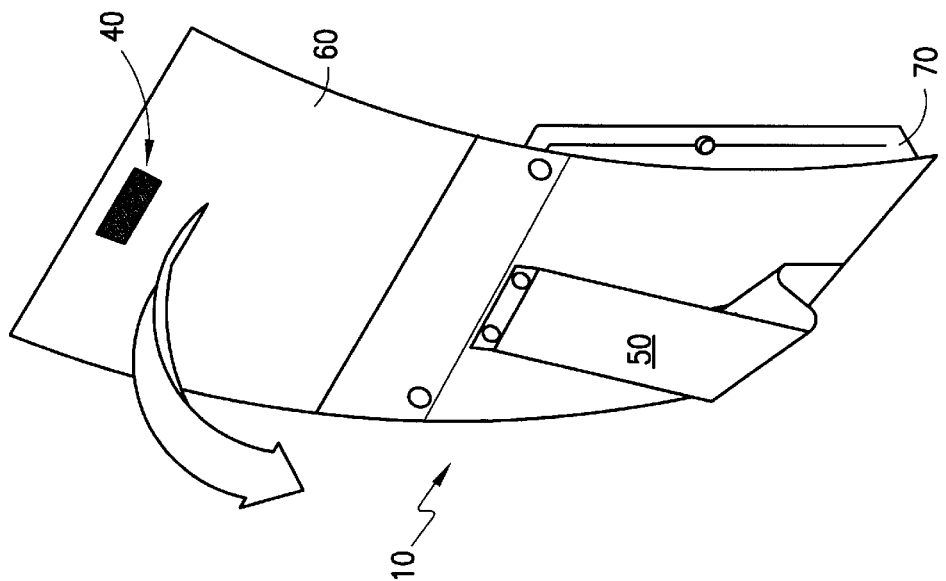
Figure 1D:
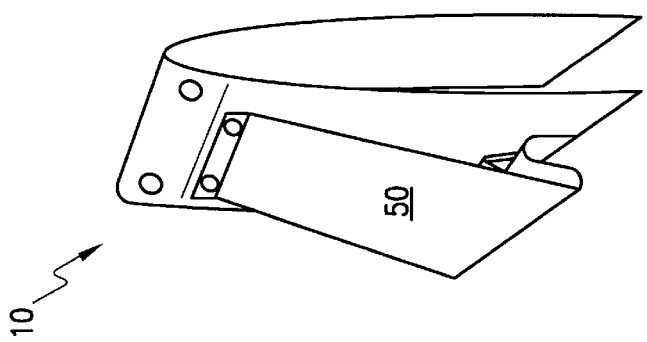
Figure 2B:
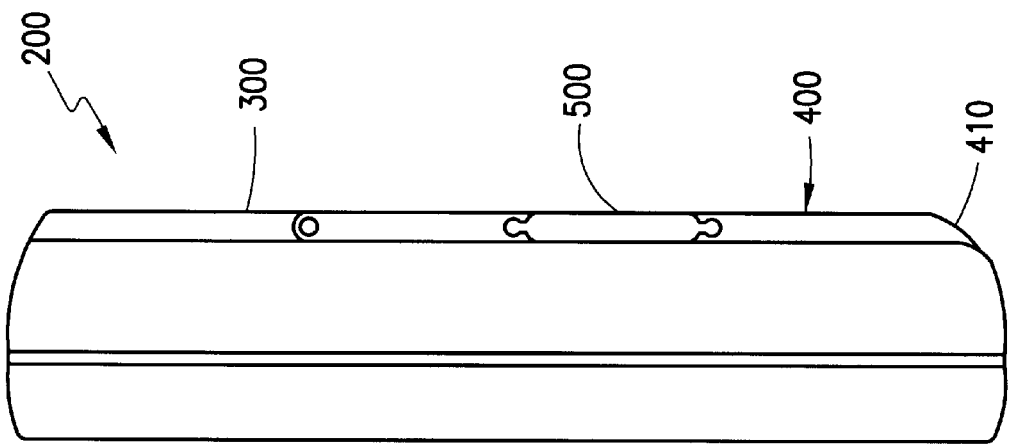
FIG. 2B is a side view of the closed viewing stand attached to the electronic device shown in FIG. 2A.
Figure 2A:
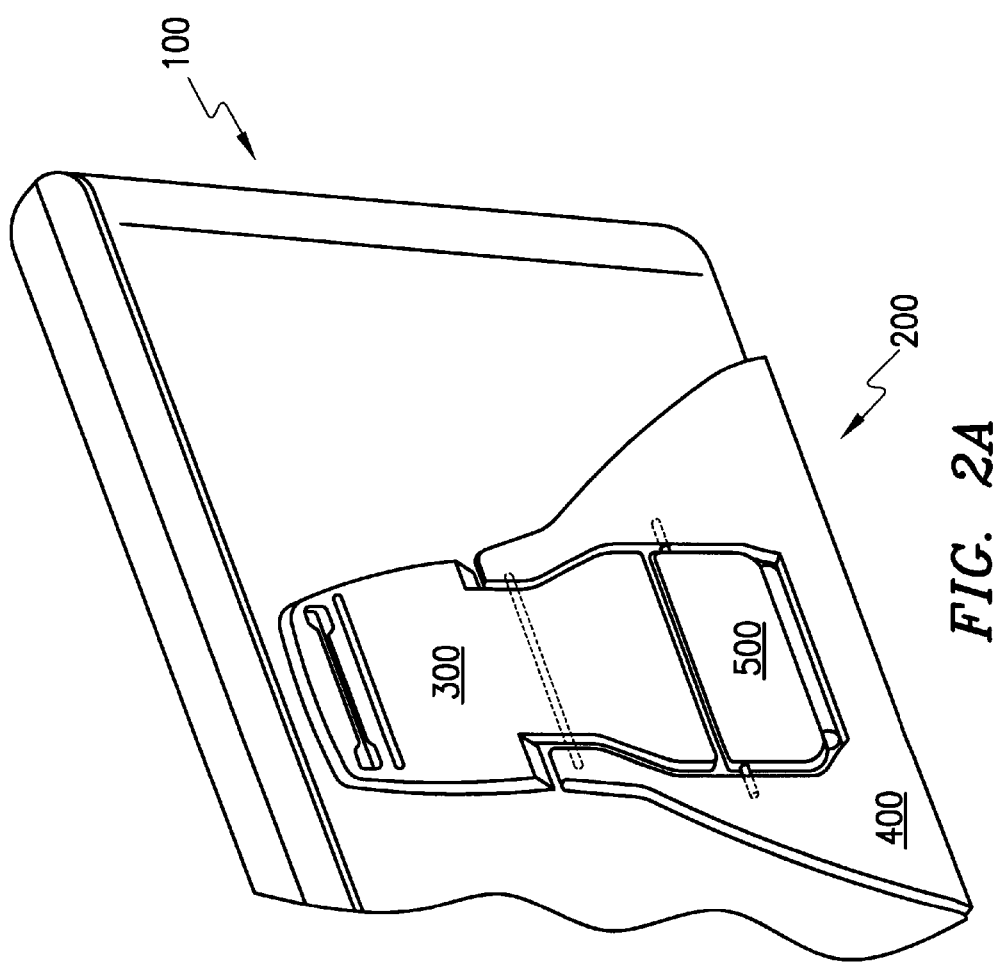
FIG. 2A is a perspective view of a closed viewing stand attached to an electronic device, in accordance with a preferred embodiment of the present invention.

FIGS. 2A and 2B illustrate a viewing stand 200 mounted (fixedly or removably attached) to an electronic device 100, in accordance with a preferred embodiment of the present invention. Viewing stand 200 is shown in a closed position. As shown in FIGS. 2A and 2B, viewing stand 200 includes a mounting plate 300, base 400, and selection arm 500. As shown in FIG. 2B, in a closed position, viewing stand 200 can be folded flat to maintain a narrow profile when not in use. In this embodiment, a support edge 410 of base 400 includes a curved profile to follow the curvature of electronic device 100. The curved profile also facilitates in maintaining the narrow profile when the viewing stand is folded flat.

Figure 3:
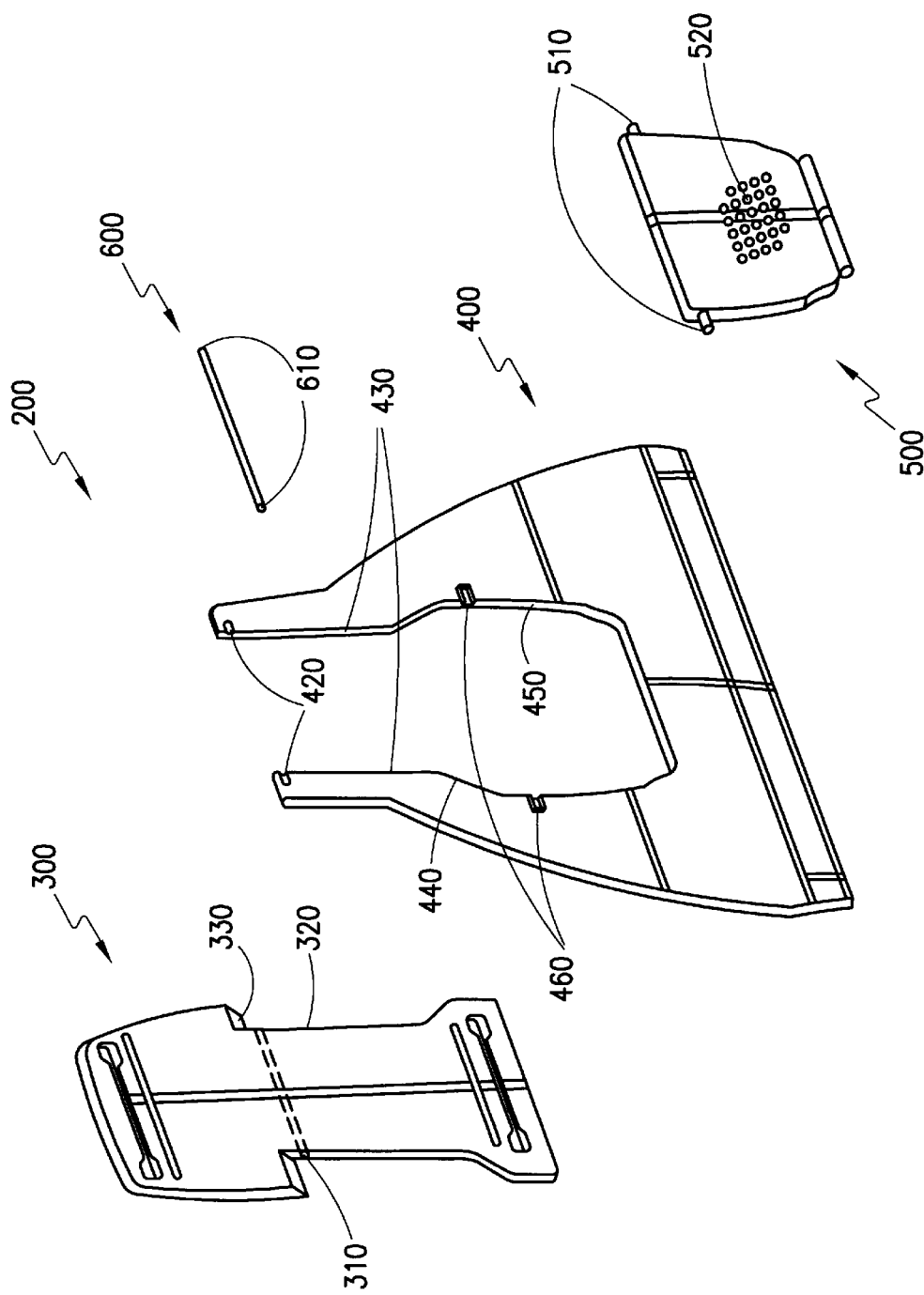
FIG. 3 is an exploded perspective view of component parts of the viewing stand shown in FIGS. 2A and 2B.

FIG. 3 is an exploded perspective view of component parts of the viewing stand 200 shown in FIGS. 2A and 2B. The mounting plate 300 includes a bore 310 through which a pivot pin 600 is placed. Preferably, pivot pin 600 is longer than bore 310. Each opposing end of pivot pin 610 snaps into tabs 420 arranged at an end of arms 430 on base 400. Base 400 includes a first inner contour 440 to fit around a tongue 320 of mounting plate 300. Base 400 rotates with respect to mounting plate 300 around pivot pin 600. Alternatively, other rotational connections (instead of a pivot pin) can be used. Mounting plate 300 has a clearance edge 330 that provides enough space for base 400 to rotate with respect to the mounting plate 300. See FIG. 4A below for another view of clearance edge 330.

In FIG. 3, base 400 includes a second inner contour 450 that functions to fit around the selection arm 500. Base 400 includes rotation tabs 460 that receive rotation pins 510 of selection arm 500. Selection arm 500 rotates with respect to base 400 around rotation pins 510. Alternatively, other rotational connections (instead of pins) can be used. Selection arm 500 preferably includes a textured area, such as a plurality of holes 520 or a set of ridges, to facilitate gripping with fingertips.

Also in FIG. 3, base 400 is shown being formed from one piece of material, which is cost-effective. In this embodiment, selection arm 500 can be rotatably secured to base 400 by snap-fitting rotation pins 510 into rotation tabs 460. As a non-exhaustive alternative, base 400 can be comprised of two reflexive parts that rotatably "sandwich" selection arm 500 at rotation pins 510 and rotation tabs 460. Likewise, the two reflexive parts would pivotally "sandwich" pivot pin 600 at each opposing end of pivot pin 610 and tabs 420. This "sandwiched" construction can provide superior strength.

FIGS. 4A and 4B illustrate an open viewing stand 200 and electronic device 100 set in an upright position, in accordance with a preferred embodiment of the present invention. This placement facilitates horizontal viewing of the electronic device. Note that mounting plate 300 is physically attached to electronic device 100 using any known fabrication technique. For example, mounting plate 300 could be molded into electronic device 100, secured with screws, or bonded with an adhesive. FIG. 4A also illustrates the clearance edge 330 shown in FIG. 3. FIG. 4B reveals the locations and angles interconnecting mounting plate 300, base 400, and selection arm 500 of viewing stand 200 in an upright, open position.

Figure 5B:
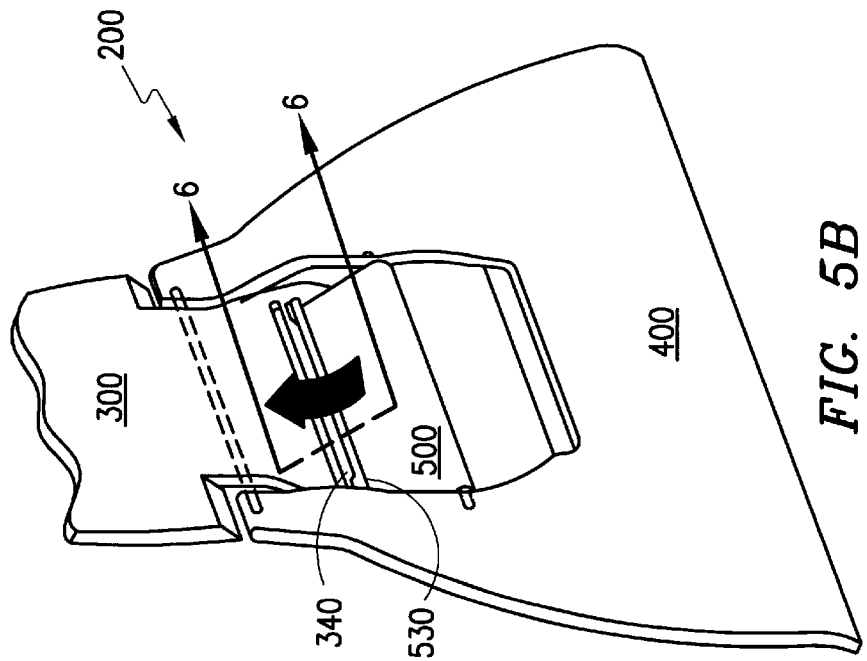
FIGS. 5A and 5B are diagrams that illustrate an operation of setting a viewing stand attached to a small electronic device to a particular position, in accordance with a preferred embodiment of the present invention.
Figure 5A:
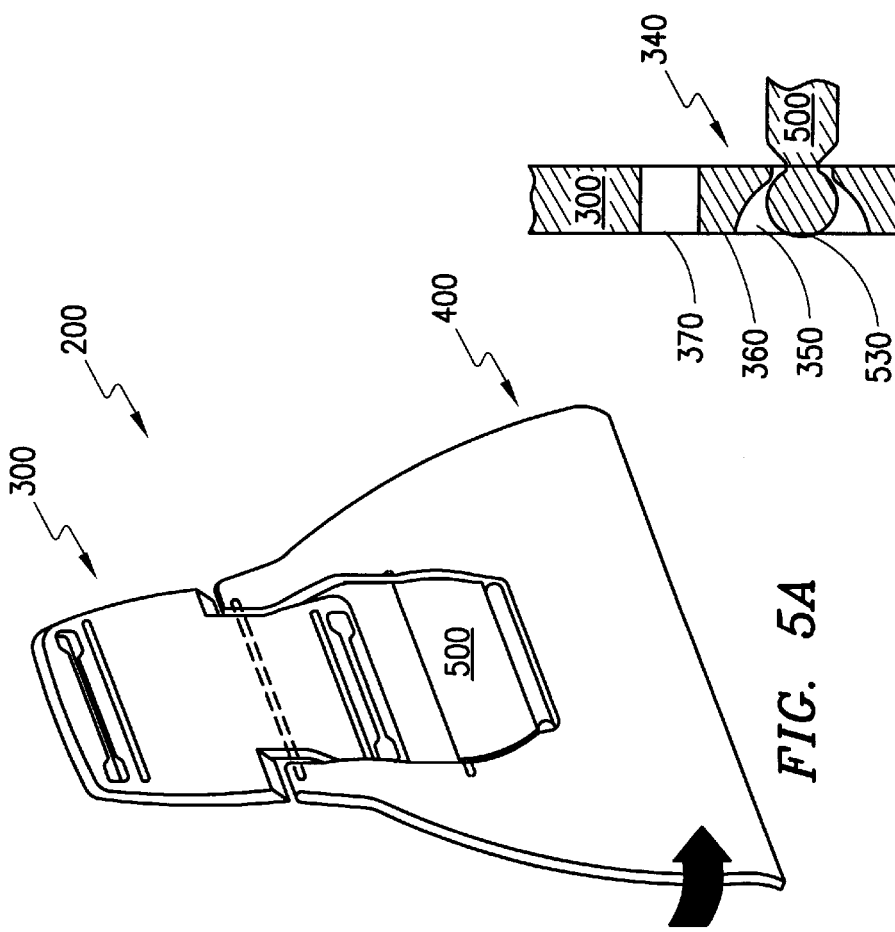

FIGS. 5A and 5B illustrate an operation that can be used for setting viewing stand 200 to a particular viewing angle, in accordance with a preferred embodiment of the present invention. As shown by the large striped arrows in FIGS. 5A and 5B, base 400 can be rotated with respect to the mounting plate 300 to a first angle. Subsequently, selection arm 500 can be rotated with respect to base 400 to a second angle so that selection tab 530 mates with positioning receptacle 340 on mounting plate 300. Selection tab 530 can then be inserted into positioning receptacle 340 to maintain the second angle. Also, it is noted that the cross sectional view of FIG. 6 is denoted by line 6-6, which passes through mounting plate 300 and selection arm 500.

Figure 6:
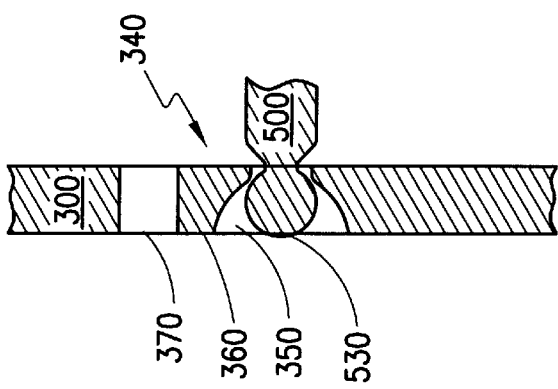
FIG. 6 is a diagram that illustrates a cutaway view of a positioning receptacle for the viewing stand shown in FIG. 5B, in accordance with a preferred embodiment of the present invention.

FIG. 6 is a diagram that illustrates a cutaway view of positioning receptacle 340 for the viewing stand shown in FIG. 5B, in accordance with a preferred embodiment of the present invention. This cutaway view is a cross section taken from Section 6-6 of FIG. 5B. Positioning receptacle 340 on mounting plate 300 securely maintains a particular viewing angle by holding selection tab 530 of the selection arm 500. Selection tab 530 is inserted into a selection slot 350 to form an interference fit along at least a portion of the length of selection slot 350.

A flexible member 360 and flexible slot 370 (also called a flex slot) enable selection slot 350 to receive the selection tab 530, which is preferably larger in dimension than selection slot 350. As selection tab 530 is inserted into selection slot 350, the void created by flexible slot 370 allows flexible member 360 to bend or give way in the direction of flexible slot 370, which widens selection slot 350 enough so that selection tab 530 can be inserted. Once selection tab 530 is inserted, flexible member 360 returns to its normal position, which secures the position of selection tab 530 in selection slot 350. Although a selection tab and selection slot arrangement have been particularly shown, the invention is not intended to be so limited. Other arrangements can be used to create attachment points for attaching selection arm 500 to mounting plate 300, including, but not limited to, other techniques involving positioning receptacle(s) 340.

Preferably, selection tab 530 is substantially cylindrical in cross-section, and selection slot 350 is substantially semi-circular in cross-section. Consequently, selection tab 530 can be inserted into selection slot 350 at an angle other than a right angle. Furthermore, flexible slot 370 and flexible member 360 are preferably located on the side of selection slot 350 toward which the selection tab is to be inserted. This arrangement requires a relatively low amount of force to insert selection tab 530 into selection slot 350.

If a different viewing angle is desired, selection tab 530 can be detached from positioning receptacle 340 and inserted into a different positioning receptacle 340, or (as illustrated in FIGS. 2A and 2B) base 400 and selection arm 500 can be rotated flat against the surface of electronic device 100 if viewing stand 200 is no longer to be used. Although in FIGS. 2A–8 two positioning receptacles 340 (one positioning receptacle 340 per general location, which are preferably generally gently sloping and generally upright locations) are shown that allow electronic device 100 to be positioned at one of two convenient viewing angles, additional viewing angles can be provided with additional positioning receptacles. In other words, with multiple positioning receptacles 340 at either or both ends of mounting plate 300, multiple viewing angles at either or both general locations can be provided.

FIGS. 7A and 7B show viewing stand 200 and electronic device 100 arranged with a low viewing angle, in accordance with a preferred embodiment of the present invention. This angle allows a user to conveniently view electronic device 100 from above. To operate the present invention in this manner, base 400, originally in a closed position as in FIGS. 2A and 2B, is rotated with respect to mounting plate 300 preferably greater than one hundred and thirty degrees (though a wide variance in this parameter is contemplated depending upon the viewing requirements of a given electronic device). In this preferred embodiment, base 400 is rotated sufficiently so that selection arm 500 can engage positioning receptacle 340 located near the top of electronic device 100. The electronic device 100 will then be positioned at a gentle slope of preferably approximately 15–20 degrees (although both lesser and greater angles can constitute a gentle slope) against the table top.

Figure 8:
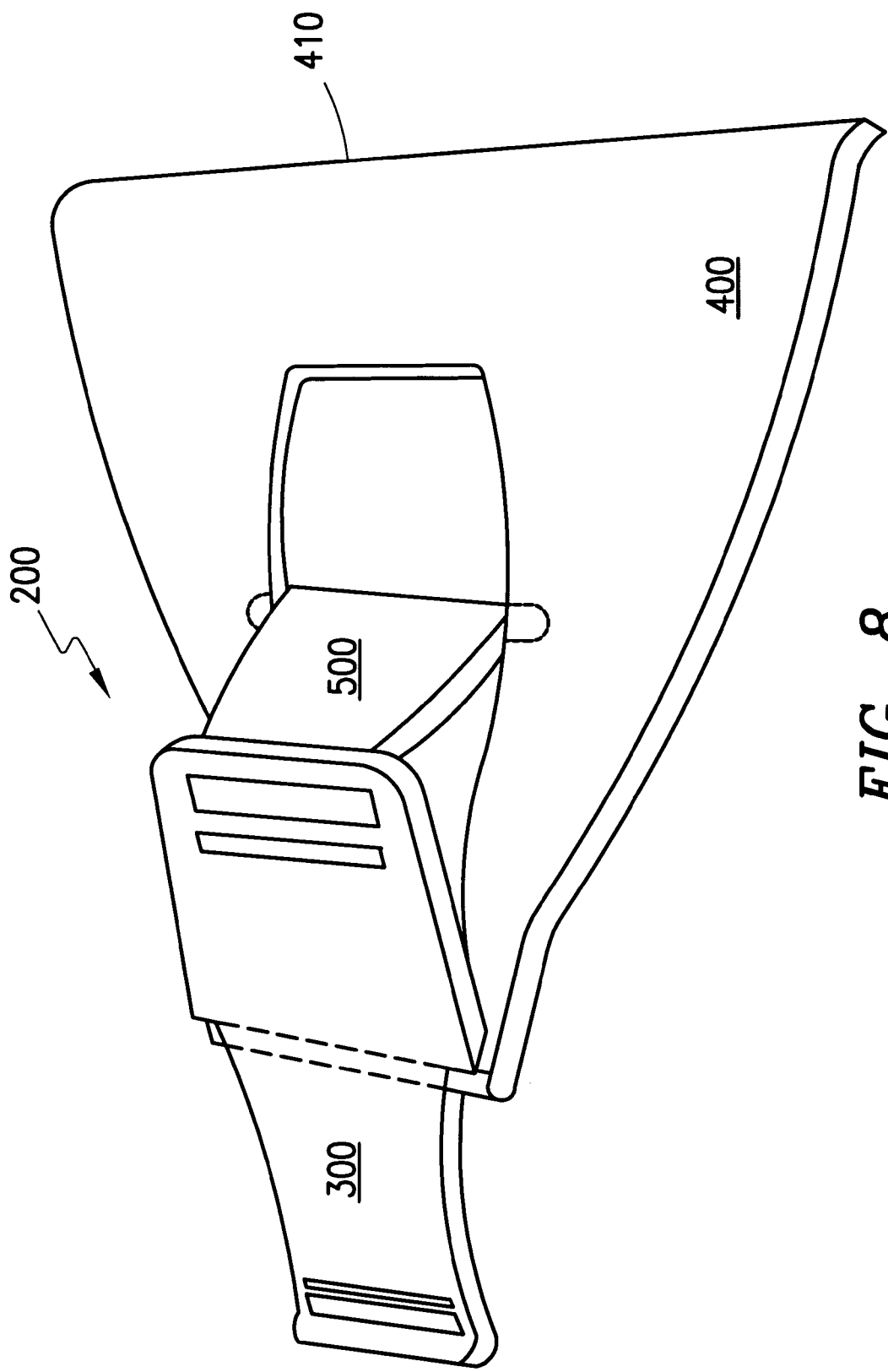
FIG. 8 is a different perspective view of the viewing stand set at a low viewing angle, in accordance with a preferred embodiment of the present invention.

FIG. 8 is a diagram that more clearly shows viewing stand 200 set at the low viewing angle shown in FIGS. 7A and 7B. The wide support edge 410 of base 400 provides stability to prevent the viewing stand from tipping over.

Viewing stand 200 is preferably manufactured from plastic. Plastic would facilitate molding the viewing stand directly into the case of the electronic device, if desired. Alternatively, viewing stand 200 could be constructed of sheet metal to reduce the thickness of the stand; however, the overall geometry and relationship between the parts is similar. With either the plastic or sheet metal embodiment, the pivot pin 600 is preferably metal.

Many modifications of the preferred embodiments will become apparent to artisans once the disclosed invention has been read and understood. As one example, viewing stand 200 can be constructed of two selection arms, each similar to selection arm 500. One of the two selection arms can be pivotally connected to mounting plate 300 at each of its opposite ends. In operation, base 400 would be rotated outward with respect to mounting plate 300, and the nearer selection arm would be pivoted away from mounting plate 300 and attached to base 400. In this modification, base 400 can have a plurality of positioning receptacles disposed on both sides (each side providing receptacles for one of the two selection arms) to receive the selection tabs.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A viewing stand for an electronic device, comprising:
a mounting area having at least a first and a second attachment point;
a first member pivotally coupled to said mounting area between and away from said first and second attachment points; and
a second member having first and second ends, said first end rotatably coupled to said first member and said second end adapted to be attached to said mounting area at said first and second attachment points.

2. The viewing stand of claim 1, wherein:
said first attachment point comprises a receptacle.

3. The viewing stand of claim 2, wherein:
said receptacle comprises a slot.

4. A viewing stand for an electronic device, comprising:
a mounting plate having at least one attachment point;
a base pivotally coupled to said mounting plate away from said at least one attachment point;
a selection arm having first and second ends, said first end rotatably coupled to said base and said second end adapted to be attached to said mounting plate at said at least one attachment point; and
wherein said at least one attachment point comprises a positioning receptacle;
said positioning receptacle comprises a selection slot;
said selection slot is located adjacent to a flexible member, said flexible member for allowing said selection slot to widen; and
said flexible member is located adjacent to a flex slot, said flex slot for allowing said flexible member to flex.

5. The viewing stand of claim 3, wherein:
said slot forms an interference fit with said second end of said second member.

6. The viewing stand of claim 3, wherein:
said slot is at least partially approximately semicircular in cross section.

7. The viewing stand of claim 1, wherein:
said mounting area is pivotally coupled to said first member by a pin.

8. The viewing stand of claim 7, wherein:
said mounting area includes a bore for housing said pin.

9. The viewing stand of claim 7, wherein:
said first member includes at least one tab for securing said pin.

10. A viewing stand for an electronic device, comprising:
a mounting plate having at least one attachment point;
a base pivotally coupled to said mounting plate away from said a least one attachment point;
a selection arm having first and second ends, said first end rotatably coupled to said base and said second end adapted to be attached to said mounting plate at said at least one attachment point; and
wherein said base includes a first inner contour for fitting around said mounting plate.

11. The viewing stand of claim 10, wherein:
said mounting plate includes a tongue for fitting within said first inner contour of said base.

12. The viewing stand of claim 10, wherein:
said mounting plate includes a clearance edge for allowing said base to pivot with respect to said mounting plate.

13. The viewing stand of claim 1, wherein:
said first member includes a first end and a second end, said first end of said first member being pivotally coupled with said mounting area and said second end of said first member being wide for support.

14. The viewing stand of claim 13, wherein:
said second end of said first member further includes an edge that fits the form of the electronic device.

15. The viewing stand of claim 1, wherein:

said first member includes an inner contour for fitting around said second member.

16. The viewing stand of claim 15, wherein:

said second member includes a shape for fitting within said inner contour of said first member.

17. The viewing stand of claim 1, wherein:

said first member includes a tab for rotatably coupling with said first end of said second member.

18. The viewing stand of claim 17, wherein:

said first end of said second member includes a pin for rotatably coupling with said tab of said first member.

19. The viewing stand of claim 1, wherein:

said second member includes a textured area to facilitate gripping with fingertips.

20. The viewing stand of claim 19, wherein:

said textured area of said second member comprises a plurality of holes.

21. The viewing stand of claim 1, wherein:

said second end of said second member is at least partially approximately cylindrical in cross section.

22. A method for operating a viewing stand for an electronic device, said viewing stand comprising a mounting plate, a base, and a selection arm operably interconnected, said method comprising the steps of:

rotating said base with respect to said mounting plate to a first general location;

rotating said selection arm with respect to said base to a first angle;

attaching said selection arm to said mounting plate;

detaching said selection arm from said mounting plate;

rotating said base with respect to said mounting plate to a second general location;

rotating said selection arm with respect to said base to a second angle;

attaching said selection arm to said mounting plate; and wherein said first general location is established by rotating said base with respect to said mounting plate by less than 130 degrees, and said second general location is established by rotating said base with respect to said mounting plate by more than 130 degrees.

23. The method of claim 22, further comprising the steps of:

detaching said selection arm from said mounting plate;

rotating said selection arm with respect to said base to a third angle; and attaching said selection arm to said mounting plate.

24. The method of claim 23, further comprising the steps of:

detaching said selection arm from said mounting plate;

rotating said base with respect to said mounting plate to said first general location;

rotating said selection arm with respect to said base to a fourth angle; and attaching said selection arm to said mounting plate.

25. The viewing stand of claim 1, wherein:

said mounting area comprises a raised mounting plate.

26. The viewing stand of claim 1, wherein:

said first member comprises a base.

27. The viewing stand of claim 1, wherein:

said second member comprises a selection arm.

28. The viewing stand of claim 3, wherein:

said slot is located adjacent to a flexible member, said flexible member for allowing said slot to widen.

29. The viewing stand of claim 28, wherein:

said flexible member is located adjacent to a flex slot, said flex slot for allowing said flexible member to flex.

30. The viewing stand of claim 1, wherein:

said first member includes an inner contour for fitting around said mounting area.

31. The viewing stand of claim 30, wherein:

said mounting area includes a tongue for fitting within said inner contour of said first member.

32. The viewing stand of claim 1, wherein:

said mounting area comprises a raised mounting plate; and said raised mounting plate includes a clearance edge for allowing said first member to pivot with respect to said raised mounting plate.

* * * * *

UNITED STATES PATENT AND TRADEMARK OFFICE
CERTIFICATE OF CORRECTION

PATENT NO. : 5,927,673
DATED : Jul. 27, 1999
INVENTOR(S) : Kurokawa et al.

It is certified that error appears in the above-identified patent and that said Letters Patent is hereby corrected as shown below:

Column 2, line 17  Replace "internal"
With --integral--

Signed and Sealed this

Twenty-first Day of December, 1999

*Attest:*

Q. TODD DICKINSON

*Attesting Officer*   *Acting Commissioner of Patents and Trademarks*